April 22, 1924.

G. L. MILLER 1,491,613

APPARATUS FOR GAUGING TAPER PIECES

Filed April 3, 1923   3 Sheets-Sheet 1

Fig. 1

Inventor

George L. Miller

By Freast and Bond
Attorneys

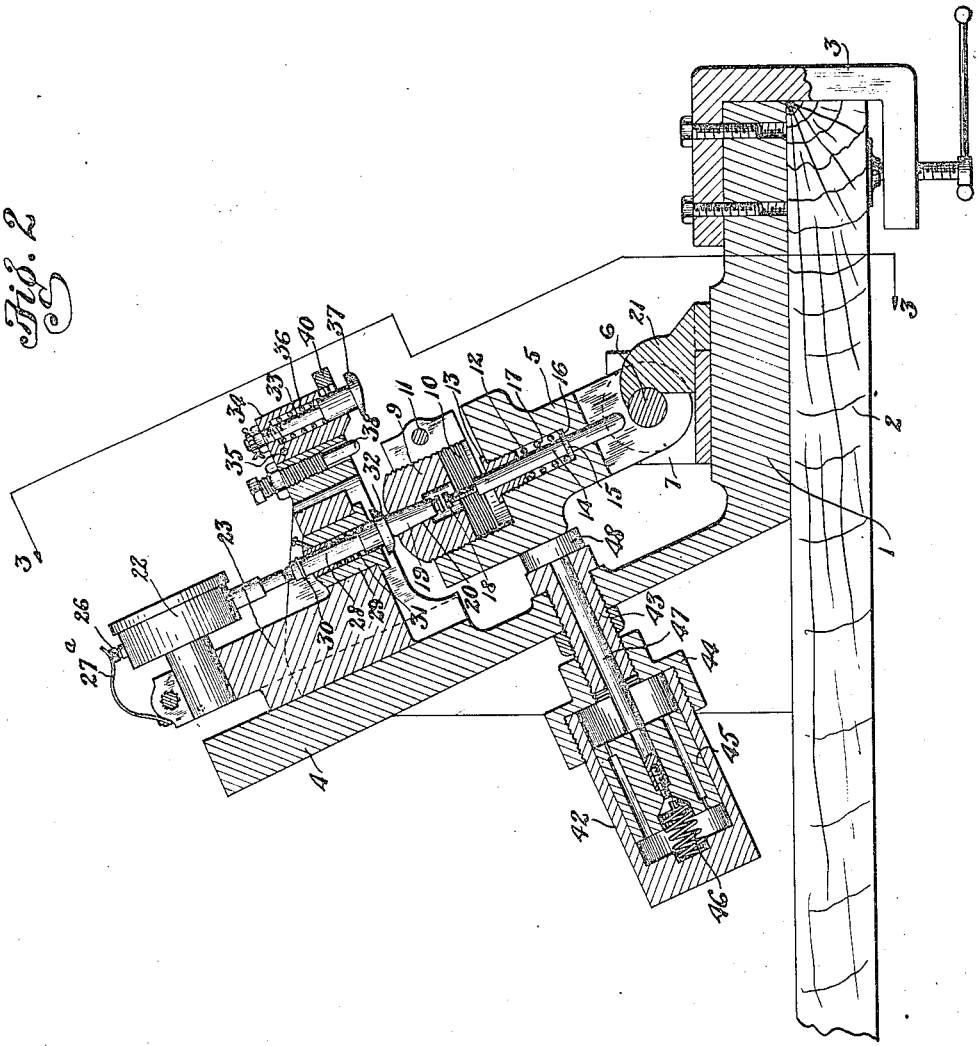

April 22, 1924.
G. L. MILLER
1,491,613
APPARATUS FOR GAUGING TAPER PIECES
Filed April 3, 1923   3 Sheets-Sheet 3
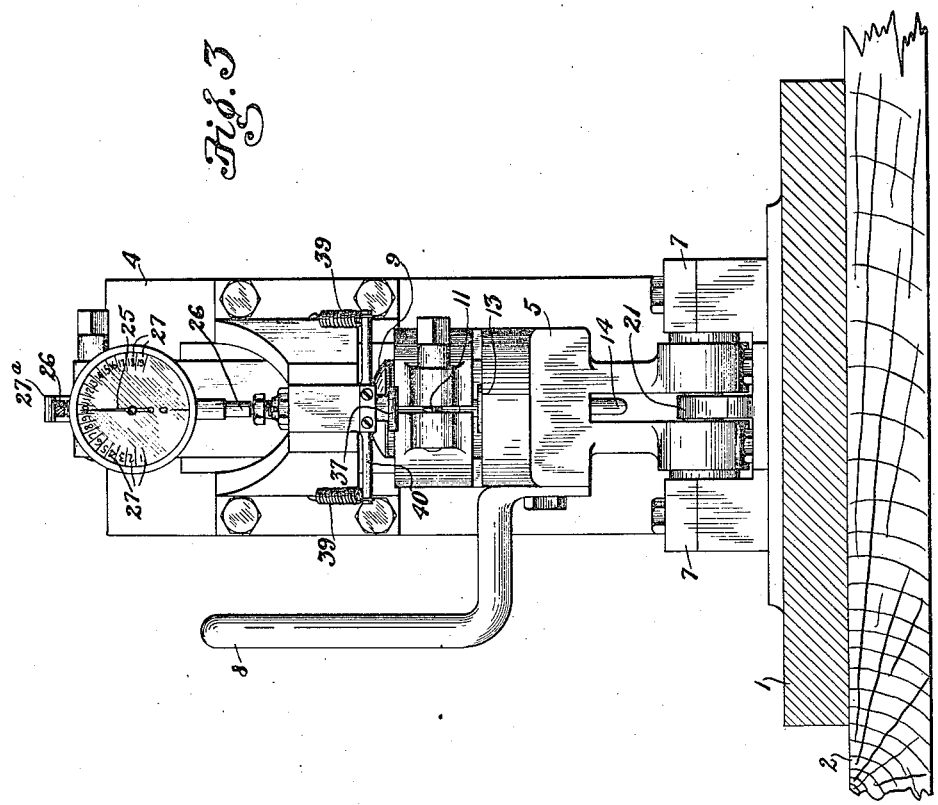
Inventor
George L. Miller
By Frease and Bond Attorneys Patented Apr. 22, 1924.

1,491,613

UNITED STATES PATENT OFFICE.

GEORGE LEE MILLER, OF CANTON, OHIO, ASSIGNOR TO THE GILLIAM MANUFACTURING COMPANY, OF CANTON, OHIO, A CORPORATION OF OHIO.

APPARATUS FOR GAUGING TAPER PIECES.

Application filed April 3, 1923. Serial No. 629,609.

*To all whom it may concern:*

Be it known that I, GEORGE LEE MILLER, a citizen of the United States, residing at Canton, in the county of Stark and State of Ohio, have invented certain new and useful Improvements in Apparatus for Gauging Taper Pieces, of which the following is a specification.

This invention relates to an apparatus for gauging taper pieces, and more particularly to a manually operated device which contemplates the gauging of taper rollers by the method disclosed in my prior Patent No. 1,367,199, dated February 1, 1921, which method consists broadly in introducing the taper pieces into an open ended taper socket and bringing the end portion of the taper piece into contact with a gauging member.

The objects of the invention are to provide a simple and thoroughly efficient, manually operated apparatus for quickly and accurately gauging taper pieces, and more particularly the rollers for taper roller bearings.

With a method at present employed for manufacturing roller bearings in order to increase the production and cheapen the manufacture the rollers and cones are produced in automatic machines. This method results in the production of cones and rollers which vary somewhat in dimensions.

It is found in practice that a considerable number of the cones, as well as the rollers, will be above standard size and substantially the same number will be below standard size. By selecting rollers which are very close to standard size they may be introduced into a bearing having a cone of standard size, and thus produce a bearing of standard size; by selecting rollers below the standard size and introducing them into a bearing having a cone above standard size, the result is to produce a bearing of standard size; and by selecting rollers which are above standard size for a bearing having a cone below standard size the result is to produce a bearing of standard size.

From the foregoing, it will be seen that it is highly important to carefully gage the rollers, in order that all the rollers in a given bearing may perform their functions in the proper manner.

Accurate gauging and assorting of the rollers by the method of measuring differences in diameters of the rollers is practically impossible, owing to the slight variations in the diameters of the rollers; and in accordance with the present invention the taper rollers are introduced into an accurately prepared taper socket from which they protrude, and the protruding ends are carried past an indicating device which registers the size of the roller.

It will be seen that a very slight variation in the diameter of the roller will make a very considerable difference in the distance which the roller will project from the socket; hence, by following the method here referred to, it is possible to attain great accuracy in gauging the rollers without the necessity of the utmost accuracy in the construction of the apparatus for effecting this result.

In accordance with the present invention the taper rollers are introduced into a taper socket mounted upon an oscillating arm and arranged to be moved beneath the plunger of an indicating device, which accurately gages the size of the roller, means being provided for automatically releasing the roller from the socket upon the backward movement of the oscillating arm.

A preferred embodiment of the invention is illustrated in the accompanying drawings, in which—

Figure 1 is a side elevation of a gauging machine embodying the invention, being broken in section for the purpose of illustration, showing the oscillating arm in the inoperative position;

Fig. 2, a longitudinal vertical sectional view through the machine showing the same in the operative position; and Fig. 3, a section on the line 3—3, Fig. 2.

Similar numerals of reference indicate corresponding parts throughout the drawing.

The machine comprises the base 1 arranged to be mounted upon a bench or table 2, as by the clamp 3 and is provided with the preferably rearwardly inclined upright 4.

An arm 5 is pivoted at its lower end, as at 6 upon the bearings 7, mounted upon the base, and is provided with the operating handle 8 for manually oscillating the arm. The cylindrical gage block 9 is provided with a screw-threaded exterior for adjustably securing the same in the internally threaded socket 10 formed in the upper end of the arm, and the socket 10 is preferably split longitudinally and provided with the clamping bolt 11 for fixing the gage block in adjusted position.

A longitudinal bore 12 is extended through the arm 5, coaxial with the threaded socket 10 and provided, in its upper end, with the thimble 13 through which is slidably mounted the plunger 14, a fixed collar 15 being mounted intermediate the extremities of the plunger and normally held in engagement with the shoulder 16 of the bore by means of the coil spring 17 which is interposed between the thimble 13 and the collar.

The upper end of the plunger is provided with the adjustable screw 18 for engagement with the lower end of the roller shown at 19, which is placed in the taper socket 20, of the gage block, for gauging the same.

The lower end of the plunger extends through the bottom of the arm 5 and is arranged to engage the eccentric cam block 21, which is located adjacent to the pivotal point of the arm, to release the roller from the taper socket in the gage block, upon the backward movement of the arm, after the roller has been gaged.

An indicator 22 of any well known description is mounted upon the upper portion of the substantially L-shaped yoke 23 which is fixed upon the upper portion of the inclined upright. The indicator is provided with a hand 25 arranged to be operated through the plunger 26 to register upon the graduations 27 upon the dial of the indicator. A spring 27ª engages the upper end of the plunger where it protrudes through the top of the indicator and normally holds the plunger down, holding the hand in the zero position.

A spring pressed plunger 28 is slidably mounted in the thimble 29 carried in the yoke 23 and provided with the collar 30 which is normally held in engagement with the upper end of the thimble by means of the coil spring 31, which engages the head 32 upon the lower end of the plunger, holding the plunger in the path of the roller 19 when the arm is moved into the operative position, shown in Fig. 2.

In this position the plunger 28 will be raised by engagement of the protruding upper end of the roller, and as the upper end of the plunger 28 engages the lower end of the plunger 26 of the indicator, the indicator will be operated, registering the size of the roller.

A plunger 33 is mounted in the block 34, pivoted as at 35 to the end of the yoke 23, engaged by a coil spring 36 which normally holds the beveled head 37 thereof in lowered position to engage the upper end of each roller, as the arm is moved forward, driving the roller tightly down into the socket 20 of the gage block. In the event the roller is too large to pass through the machine it will engage the top pin 38 which is carried upon the block 23 adjacent to the plunger 33, thus preventing further forward movement of the arm 5 and indicating to the operator that the roller is too large.

The block 34 is normally held in the position shown in the drawings by means of the coil springs 39, which are connected to the cross arm 40 at the lower end of the block and to the pins or screws 41 upon the lower portion of the L-shaped yoke.

For the purpose of preventing a shock upon the machine with each operation of the arm 5, a dash pot 42 is connected to the inclined upright 4 as by the threaded bearing 43 and cap 44. A piston 45 is provided in the dash pot and normally urged outward by means of the coil spring 46, the piston rod 47 being slidably extended through the bearing 43 and provided with the head 48 to be engaged by the arm 5, as it reaches the operative position shown in Fig. 2.

The operation of the machine is as follows: With the arm 5 in the inoperative position, as shown in Fig. 1, a roller, indicated at 19, is placed in the socket 20, of the gage block, as shown in said figure.

The handle 8 is grasped by the operator and the arm thrown into the operative position shown in Fig. 2. As the roller passes beneath the plunger 37 it is driven tightly into the socket 20 of the gage block. In the event the roller is too large the protruding end thereof will contact with the stop pin 38 preventing further forward movement of the arm 5. The operator will then throw the arm back to the inoperative position and remove the oversize roller placing it in a receptacle for the purpose.

Assuming that the roller is under size, it will pass beneath the head of the plunger 28 without engaging the same and the operator will throw the arm back to the normal position and remove the under size roller and place it in a receptacle provided for under sized rollers.

Assuming that the roller is neither under size nor over size the protruding end thereof will engage the head of the plunger 28 which will be raised against the pressure of the spring 31, raising the plunger 26 of the indicator and operating the hand thereon to indicate the size of the roller. The operator will then throw the arm back to the normal position, the protruding end of the roller engaging the head of the plunger 37, as it passes the same rocking the block 34 upon its pivot 35 to permit the roller to pass backward beneath the same, the springs 39 returning the block to normal position after the roller has passed.

As the arm is moved to the normal position the lower end of the plunger 14 will engage the cam block 21 and be forced upward against the pressure of the spring 17 engaging the lower end of the roller and unseating the same from the socket 20 permitting the roller to be easily removed from the gage block and placed in the proper receptacle provided for rollers of that size.

In machines constructed in accordance with the invention, as above disclosed, it has been found that very accurate gauging can be quickly and readily accomplished. In the machines now in use constructed in accordance with the invention a difference of one thousandth of an inch in length of a roller is equivalent to a difference of one-eighteenth of a thousandth of an inch in diameter owing to the taper of the roller, and as the indicator is graduated to register in fifths of a thousandth of an inch in the length of the roller it will be obvious that it is possible to gage the diameters of the rollers very closely.

Further the machine is of simple construction having provision for ready interchangeability of sockets to adapt the machine to the gauging and assorting of rollers for bearings of different size, and such a machine operates with certainty and precision and is easily maintained in operative position.

The foregoing description has been given for clearness of understanding only, and no unnecessary limitations should be understood therefrom, but the appended claims should be construed as broadly as permissible in view of the prior art.

I claim.

1. A gauging apparatus for taper pieces including an oscillating arm having a taper socket adapted to receive a taper piece for gauging purposes, an indicator having a part normally fixed relative to the axis of oscillation of the arm adapted to be engaged by the end portion of a taper piece carried in said socket, and manual means for oscillating the arm.

2. A gauging apparatus for taper pieces including an oscillating arm having a taper socket adapted to receive a taper piece for gauging purposes, an indicator having a part normally fixed relative to the axis of oscillation of the arm adapted to be engaged by the end portion of a taper piece carried in said socket, manual means for oscillating the arm, and means for preventing an oversize taper piece from engaging the indicator.

3. A gauging apparatus for taper pieces including an oscillating arm having a taper socket adapted to receive a taper piece for gauging purposes, an indicator having a part normally fixed relative to the axis of oscillation of the arm adapted to be engaged by the end portion of a taper piece carried in said socket, manual means for oscillating the arm, and a stop arranged to be engaged by an oversize taper piece to prevent operation of the arm.

4. A gauging apparatus for taper pieces including an oscillating arm having a taper socket adapted to receive a taper piece for gauging purposes, an indicator having a part normally fixed relative to the axis of oscillation of the arm adapted to be engaged by the end portion of a taper piece carried in said socket, manual means for oscillating the arm, and means for ejecting the taper piece from the socket after the gauging operation.

5. A gauging apparatus for taper pieces including an oscillating arm having a taper socket adapted to receive a taper piece for gauging purposes, an indicator having a part normally fixed relative to the axis of oscillation of the arm adapted to be engaged by the end portion of a taper piece carried in said socket, manual means for oscillating the arm, and means for forcing the taper piece tightly into the socket before it engages the indicator.

6. A gauging apparatus for taper pieces including an oscillating arm having a taper socket adapted to receive a taper piece for gauging purposes, an indicator having a part normally fixed relative to the axis of oscillation of the arm adapted to be engaged by the end portion of a taper piece carried in said socket, manual means for oscillating the arm, and means for ejecting the taper piece from the socket upon the backward movement of the arm.

7. A gauging apparatus for taper pieces including an oscillating arm having a taper socket adapted to receive a taper piece for gauging purposes, an indicator having a part normally fixed relative to the axis of oscillation of the arm adapted to be engaged by the end portion of a taper piece carried in said socket, manual means for oscillating the arm, a plunger in the arm and a cam arranged to be engaged by the plunger after the gauging operation to release the taper piece from the socket.

8. A gauging apparatus for taper pieces including an oscillating arm having a taper socket adapted to receive a taper piece for gauging purposes, an indicator provided with a plunger normally fixed with relation to the axis of oscillation of the arm adapted to be engaged by the end portion of the taper piece carried in said socket and manual means for oscillating the arm.

9. A gauging apparatus for taper pieces including an oscillating arm having a taper socket adapted to receive a taper piece for gauging purposes, an indicator provided with a plunger normally fixed with relation to the axis of oscillation of the arm adapted to be engaged by the end portion of the taper piece carried in said socket, manual means for oscillating the arm, and means for preventing an oversize taper piece from engaging the indicator.

10. A gauging apparatus for taper pieces including an oscillating arm having a taper socket adapted to receive a taper piece for gauging purposes, an indicator provided with a plunger normally fixed with relation to the axis of oscillation of the arm adapted to be engaged by the end portion of the taper piece carried in said socket, manual means for oscillating the arm, and a stop arranged to be engaged by an oversize taper piece to prevent operation of the arm.

11. A gauging apparatus for taper pieces including an oscillating arm having a taper socket adapted to receive a taper piece for gauging purposes, an indicator provided with a plunger normally fixed with relation to the axis of oscillation of the arm adapted to be engaged by the end portion of the taper piece carried in said socket, manual means for oscillating the arm, and means for ejecting the taper piece from the socket after the gauging operation.

12. A gauging apparatus for taper pieces including an oscillating arm having a taper socket adapted to receive a taper piece for gauging purposes, an indicator provided with a plunger normally fixed with relation to the axis of oscillation of the arm adapted to be engaged by the end portion of the taper piece carried in said socket, manual means for oscillating the arm, and means for ejecting the taper piece from the socket upon the backward movement of the arm.

13. A gauging apparatus for taper pieces including an oscillating arm having a taper socket adapted to receive a taper piece for gauging purposes, an indicator provided with a plunger normally fixed with relation to the axis of oscillation of the arm adapted to be engaged by the end portion of the taper piece carried in said socket, manual means for oscillating the arm, and means for forcing the taper piece tightly into the socket before it engages the indicator.

14. A gauging apparatus for taper pieces including an oscillating arm having a taper socket adapted to receive a taper piece for gauging purposes, an indicator provided with a plunger normally fixed with relation to the axis of oscillation of the arm adapted to be engaged by the end portion of the taper piece carried in said socket, manual means for oscillating the arm, a plunger in the arm and a cam arranged to be engaged by the plunger after the gauging operation to release the taper piece from the socket.

15. A gauging apparatus for taper pieces including an oscillating arm, a removable gage block therein provided with a taper socket adapted to receive a taper piece for gauging purposes, an indicator having a part normally fixed relative to the axis of oscillation of the arm adapted to be engaged by the end portion of the taper piece carried in the socket and manual means for oscillating the arm.

In testimony that I claim the above, I have hereunto subscribed my name.

GEORGE LEE MILLER.